United States Patent [19]

Babcock et al.

[11] 3,748,485

[45] July 24, 1973

[54] OPTICAL-TO-ELECTRICAL SIGNAL TRANSDUCER APPARATUS

[75] Inventors: David L. Babcock; Richard J. Sypula, both of Rochester, N.Y.

[73] Assignee: Eastman Kodak Company, Rochester, N.Y.

[22] Filed: Oct. 5, 1971

[21] Appl. No.: 186,747

[52] U.S. Cl. .......... 250/226, 250/211 J, 178/5.2 D

[51] Int. Cl. .......... G01j 3/34

[58] Field of Search .......... 178/5.2 A, 5.2 D, 178/5.4 R, 5.4 ES, 5.4 ST; 250/211 J, 226; 307/311; 317/235 N

[56] References Cited

UNITED STATES PATENTS

| | | | |
|---|---|---|---|
| 2,808,456 | 10/1957 | Wittel | 178/5.4 R |
| 3,293,440 | 12/1966 | Mueller | 250/211 J |
| 3,447,080 | 5/1969 | Barstow | 324/73 R |
| 3,548,099 | 12/1970 | Waybright | 178/7.2 |
| 3,609,399 | 9/1971 | Hanaoka | 317/235 N |
| 3,688,166 | 8/1972 | Desvignes | 317/235 N |

OTHER PUBLICATIONS

IBM Technical Disclosure Bulletin Vol. 12, No. 11, April, 1970 "Color Sensitive Light Pen" J. L. Reynolds

*Primary Examiner*—Walter Stolwein
*Attorney*—William H. J. Kline and Joseph F. Breimayer et al.

[57] ABSTRACT

A photosensitive semiconductor array includes a plurality of photodiodes with separate output electrodes and color filters overlaying each photodiode. Each of the photodiodes, when simultaneously exposed to a point source of image bearing multicolored light focused on the photodiode array, responds by producing signals at its output terminals. The size of each photodiode and the filters overlaying same may be altered to change the response thereof. The photodiode array is useful in translating a light beam scanning motion picture film frames into red, green and blue color signals.

7 Claims, 5 Drawing Figures

DAVID L. BABCOCK
RICHARD J. SYPULA
INVENTORS

BY Joseph F. Breimayer
W. H. J. Kline
ATTORNEYS

DAVID L. BABCOCK
RICHARD J. SYPULA
INVENTOR.

BY Joseph L. Brienza
W. H. J. Kline
ATTORNEYS

OPTICAL-TO-ELECTRICAL SIGNAL TRANSDUCER APPARATUS

CROSS-REFERENCE TO RELATED APPLICATIONS

Reference is made to copending assigned copendinG U.S. Patent application Ser. No. 158,758, now U.S. Pat. No. 3,710,010, entitled REFLECTIVE DEVICE FOR COLOR SEPARATION, filed July 1, 1971 in the names of John W. Balliett and William T. Sherwood, which is a continuation-in-part of application Ser. No. 76,935, filed Sept. 30, 1970, now abandoned.

BACKGROUND OF THE INVENTION

1. Field of the Invention

This invention relates to optical-to-electrical signal transducer apparatus, and more particularly, to a photosensitive semiconductor array.

2. Description of the Prior Art

The translation of color light images, either real or recorded as on motion picture film, into electrical signals suitable for measurement purposes or for the display of the color light images has long been practiced through the use of optical-to-electrical signal transducer apparatus such as photomultiplier tubes or photosensitive semiconductor devices. In the prior art of transmitting color images as electrical signals, it is common to separate the color light image into the red, green and blue color components of the image and to translate the intensity of each of the separated components into an intensity related electrical signal. A display of the color image may then be recreated at a remote location by the translation of the respective electrical signals into their respective color components and the combination of the color components as a recreated color image.

A primary example of this technique is the well-known practice of scanning the color images of motion picture film with a flying spot scanning device and simultaneously separating the light modulated by the motion picture film into its color components. In the prior art, as shown for example in U.S. Pat. Nos. 2,776,335, 2,808,456 and 3,548,099, the modulated light is depicted as directed upon optical-to-electrical signal transducer apparatus comprising at least two dichroic or half-silvered mirrors situated in the path of the light that are operative to separate the modulated light into its color components and to direct the color components upon separate photosensitive surfaces of separate photoreceptors that translate the intensity of each color component into an electrical signal.

A disadvantage of this optical-to-electrical transducer apparatus resides in the fact that the dichroic or half-silvered mirror and the separate photoreceptors are usually relatively expensive and bulky.

SUMMARY OF THE INVENTION

Accordingly, it is an object of the present invention to inexpensively translate a light image into electrical signals representative of the color content thereof.

A particular object of this invention is to provide improved optical-to-electrical signal transducer apparatus.

It is a further object of the present invention to provide a photosensitive semiconductor array which is capable of translating light incident thereon into a plurality of color representative electrical signals.

A still more particular object of this invention is to provide an improved PIN photodiode array comprising a plurality of pie-shaped photoreceptive surfaces.

In accordance with these and other objects, a photosensitive semiconductor array is disclosed for generating electrical signals indicative of the component wavelengths of light in a light image. The term light, in the context of the specification and claims, may be defined as an electromagnetic radiation in the wavelength range including infrared, visible and ultraviolet radiation. The photosensitive semiconductor array may comprise first and second photosensitive semiconductor devices, the first and second photosensitive semiconductor devices comprising a common semiconductor region of a first semiconductor type, first and second semiconductor regions of a second semiconductor type, first and second photosensitive junctions, respectively, of the first and second semiconductor regions with the common semiconductor region and means for electrically isolating the first and second semiconductor regions from each other.

Further means are provided for directing light through the first and second semiconductor regions to penetrate the photosensitive junction. First radiation transmissive means may be located with respect to the beam of light and to the first semiconductor region for transmitting a first predetermined wavelength of light to the first photosensitive junction and second radiation transmissive means may be located with respect to the beam of light and to the second semiconductor region for transmitting a second predetermined wavelength of light to the second photosensitive Junction, whereby the first and second photosensitive semiconductor devices respond to the first and second wavelengths of light to produce first and second signals, respectively, related to the relative intensities of the light in the first and second wavelengths.

A further feature of the invention disclosed herein constitutes the positioning of the radiation transmissive means and the photosensitive semiconductor array with respect to a motion picture film frame scanned by a sharply focused moving spot of light. A first lens having an exit pupil focuses the moving spot of light onto the film frame, and a second lens focuses the exit pupil of the first lens upon the photosensitive semiconductor array. Therefore, the spot of light is modulated by the color content of the film frame and is directed by the second lens through the radiation transmissive means to the photosensitive junctions.

Other objects and advantages of the invention will become apparent from the following description taken in conjunction with the accompanying drawings.

BRIEF DESCRIPTION OF THE DRAWINGS

In the detailed description of the preferred embodiment of the invention presented below reference is made to the accompanying drawings in which.

DESCRIPTION OF THE PREFERRED EMBODIMENT

Figure 1:
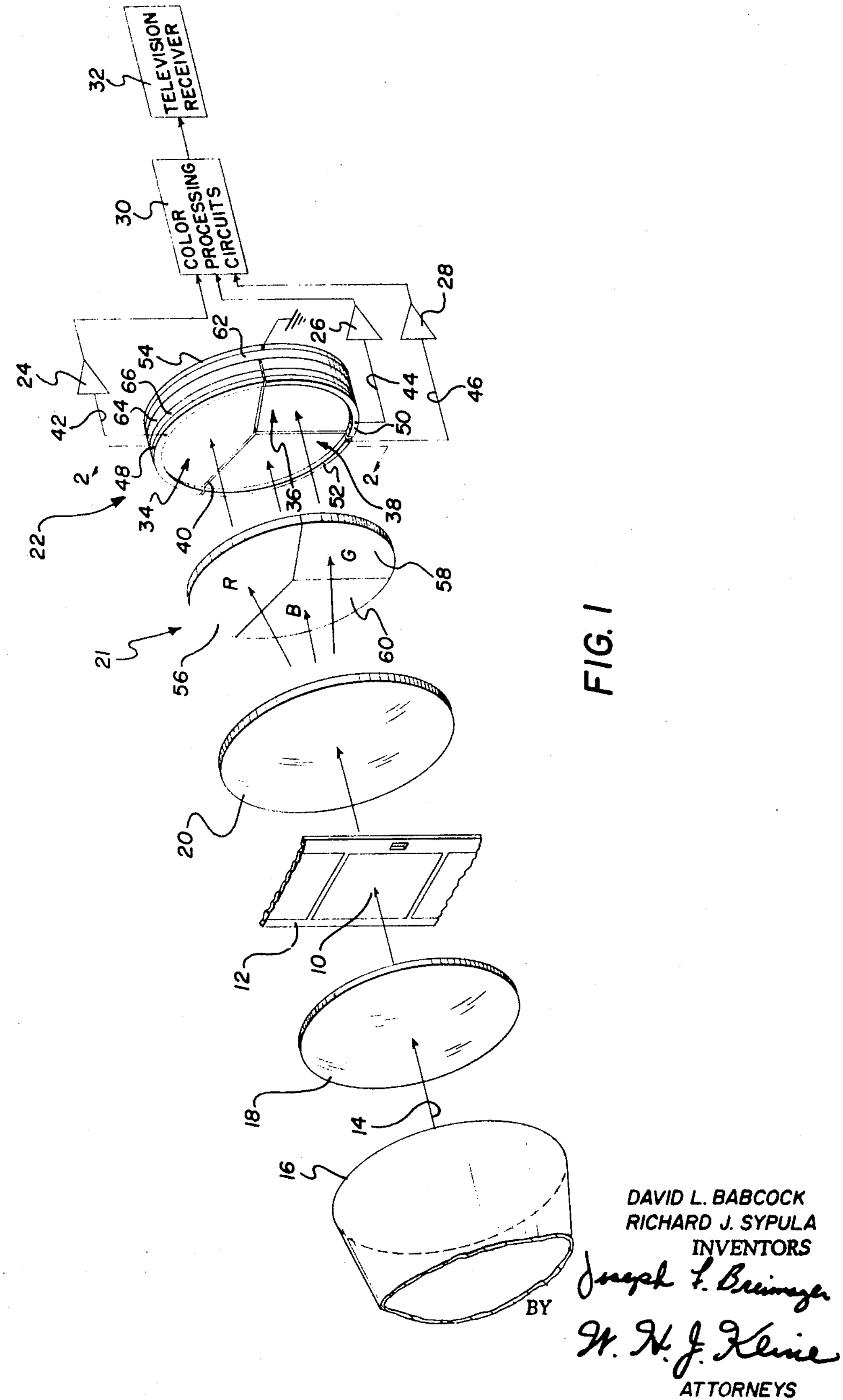
FIG. 1 is a perspective view of an optical-to-electrical signal transducer apparatus in accordance with the present invention.

Referring now to the drawings, and first to FIG. 1, there is shown in partial perspective a view of the optical-to-electrical signal transducer apparatus of the present invention. It will be understood that the elements of FIG. 1 may not be in scale but are depicted in the relationship shown in accordance with the invention. The light image, considered by way of example depicted in FIG. 1, results from the illumination of a point 10, an information storage medium such as a frame of motion picture film 12 by a beam of light 14 generated by a flying spot scanner tube 16 and focused upon the point 10 by a lens assembly 18, as shown in the aforementioned U.S. Pat. Nos. 2,776,335 and 2,808,456. The beam of light 14, radiated from the faceplate of the flying spot scanner tube 16, is scanned in the well-known television raster pattern to sequentially illuminate each point in the film frame 12 and is sharply focused by the lens assembly 18 on the point 10 of the film frame 12. The lens assembly 18 is similar in structure and operation to that lens assembly identified as 4 in the aforementioned U.S. Pat. No. 2,808,456. Lens assembly 18 directs light beam 14 through point 10, so that the light beam is modulated by the color content of that point. A collector lens 20 directs the modulated light through a filter assembly 21 to a photosensitive semiconductor array 22. In so doing, collector lens 20 forms a focused or unsharp image of the exit pupil of lens assembly 18 on the surface of array 22, regardless of the scanning position of point 10 in the film frame 12.

Further information regarding the operation of exit pupils of lens systems may be obtained from the treatise *Modern Optical Engineering The Design of Optical Systems* by Warren J. Smith, published by McGraw-Hill Book Company.

The photosensitive semiconductor array 22 develops electrical signals representative of the intensity of the color components of the image forming light directed thereon. The electrical signals are amplified by video amplifiers 24, 26 and 28 and the amplified electrical signals are applied to further color signal processing circuits that, for example, as shown in U.S. Pat. No. 3,548,099, may ultimately control the operation of a television receiver 32 to display a color image of the motion picture film frame.

The photosensitive semiconductor array 22 may comprise three photodiodes or other photosensitive semiconductor devices having three pie-shaped photoreceptive surfaces 34, 36 and 38 that are each isolated from the other by an insulator 40. The conductors 42, 44 and 46 are electrically bonded to annular electrodes 48, 50 and 52, respectively, by ball bonding techniques well known in the manufacture of semiconductive devices, and a common electrode 54 on the opposite surface of the photodiode array 16 is connected to ground potential. Associated with the pie-shaped photoreceptive surfaces 34, 36 and 38 are the pie-shaped filters 56, 58 and 60 of the filter assembly 21. The filters 56, 58 and 60 may consist of red, green and blue color transmission filter materials, respectively. Thus the photodiodes of the photosensitive semiconductor array 22 are sensitive to red, green and blue wavelengths of light transmitted by the filters 56, 58 and 60 of the filter assembly 21 respectively. For ease in illustration, the filter assembly 21 is shown displaced from the photosensitive semiconductor array 22, but it will be understood that in actual practice the filter assembly 21 may be oriented in the position shown with respect to the photosensitive semiconductor array 22 but in close physical proximity thereto. Furthermore, the filter materials may be deposited as layers upon the photoreceptive surfaces 34, 36 and 38. Alternatively, the surfaces 34, 36 and 38 may be sensitized to respond to or transmit particular wavelengths of light by the inclusion of sensitizing impurities in the deposition or other manufacturing process of the photosensitive semiconductor array 22.

The collector lens 20 images the exit pupil of the lens assembly 18 onto the entire surface of the filter assembly 21 and photosensitive semiconductor array 22. In other words, regardless of the position of the scanning beam 14 of the flying spot scanner tube 16, the collector lens 20 images the image forming light from the scanned point 10 in the film frame 12 through the filters 56, 58 and 60 of the filter assembly 21 and upon the photoreceptive surfaces 34, 36 and 38 of the photosensitive semiconductor array 22, this image forming light being out of focus at the photosensitive semiconductor array 22. Since the collector lens 20 images the exit pupil of the scanning lens 18 upon the photosensitive semiconductor array 22, the colors in the image forming light from any scanned point 10 in the film frame 12 are uniformly mixed and equally divided in intensity among the three photoreceptive surfaces 34, 36 and 38.

Figure 2:
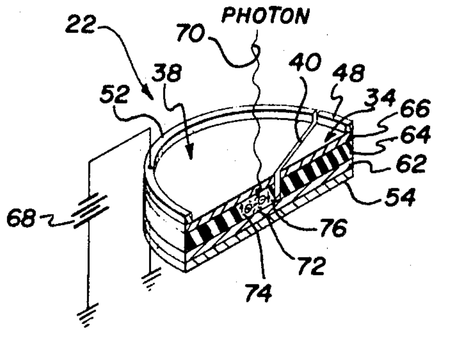
FIG. 2 is a cross-section in partial perspective of a PIN photodiode array of FIG. 1 taken along lines 2—2 of FIG. 1.

Referring now to FIG. 2 there is shown a cross-section taken along the lines 2—2 in FIG. 1 of the representative photosensitive semiconductor structure of PIN photodiode configuration. This figure is for the purpose of explanation only and is not to scale. The relative proportions have been deliberately distorted for the sake of clarity.

The photosensitive semiconductor array 22 of FIGS. 1 and 2 consists of a first electrode layer 54 consisting of a metal such as gold which covers a first surface of the first common region or body 62 of semiconductor material and which is connected to ground potential. The first common region 62 of semiconductor material may consist of an N-type semiconductor such as N-type silicon.

An insulating layer 64 of I-type material separates the second surface of the first common region 62 of semiconductor material and the first surface of a second region or body 66 of semiconductor material. The second region 66 of semiconductor material may consist of a P-type silicon layer deposited or diffused in the second surface of the insulating layer 64 (which may consist of silicon dioxide). Deposited on the second surface of the second semiconductor region 66 are second electrode layers 48, 50 and 52 (as shown in FIG. 1) which may or may not cover the entire photoreceptive surfaces 34 and 38 of the second semiconductor body 66, depending upon the light transmissivity of the electrode material. As shown in FIGS. 1 and 2, the second electrodes 48, 50 and 52 are arcuate and together form a ring or annulus, covering the peripheral area of the circular photosensitive semiconductor array 22, and such electrodes may consist of gold.

The PIN photodiode structure depicted in FIG. 2 also includes an etched channel, which constitutes the aforementioned insulator 40, extending through the second semiconductor region 66 and the insulating layer 64 and provides the electrical isolation between the surfaces 34 and 38 of the depicted PIN photodiodes. The channel 40 may be filled with highly non-conductive insulating material differing from the I-type material of the insulating layer 64. Thus the insulating layer 64 and second semiconductor region 66 are electrically divided into three parts.

A negative bias voltage source, depicted in FIG. 2 as the battery 68, is electrically connected to the second electrodes 48, 50 and 52 in each of the three pie-shaped PIN photodiodes of the photosensitive semiconductor array 22. Thus three separate electrical circuits are defined by the negative bias voltage sources, the common first electrode layer 54, the common first semiconductor region 62 and the three isolated insulating layers 64, second semiconductor regions 66 and second electrodes 48, 50 and 52.

As shown in FIG. 1 the image forming light from a point 10 in the film frame 12 is collected by collector lens 20 and passed through filter assembly 21 and strikes the photoreceptive surfaces 34, 36 and 38 of the photosensitive semiconductor array 22. The PIN photodiodes respond to photons of light penetrating the photoreceptive surfaces 34, 36 and 38 and generate photocurrents representative of the intensity of such light in a manner that is described, for example, in the article entitled "High Frequency Photodiodes" by G. Lucovsky and R. B. Emmons in *Applied Optics*, vol. 4, no. 6, June, 1965, pages 697–702, and in the *Applications Note* 915 — "Threshold Detection of Visible and Infrared Radiation with PIN Photodiodes," published by Hewlett-Packard, Inc. As shown in FIG. 2, a photon of the image forming light traveling in the path of the arrow 70 penetrates the photoreceptive surface 38 of the second semiconductor region 66 and is absorbed by the insulating layer 64. When the photon is so absorbed, it produces an electron-hole pair depicted at 72, and the hole and the electron are separated, as shown, by the negative electric field established in the insulating layer 64 by the negative bias voltage 68. The hole tends to drift in the direction of the arrow 74 and the electron tends to drift in the direction of the arrow 76. The photocurrent signals appear at the external conductors 42, 44 and 46 in response to the drift of the hole and electron in the directions of the arrows 74 and 76, respectively, through the circuits defined by the common first electrode 54, common first semiconductor region 62, and isolated insulating layers 64, second semiconductor regions 66 and second electrodes 48, 50 and 52. Since the electron tends to drift at a faster rate than the hole, the photocurrent is carried primarily by the drifting electrons.

For the highest quantum conversion efficiency (electrons produced per photon), it is desirable to have the P-type layers, that is the semiconductor regions 66, as thin as possible so that photons readily penetrate the P-type layer and are absorbed in the insulating layer 64. Consequently, it is also desirable that the insulating layer 64 be as thick as possible. The physical thickness of the insulating layer 64 is controlled during the manufacturing diffusion process. However, the effective thickness of the insulating layer 64 may be increased by the increase in magnitude of the electric field provided by the negative bias source 68. As the negative bias voltage Is increased from zero, there are three beneficial effects: (1) the hole and electron transit time decreases; (2) the conversion efficiency increases slightly; and (3) the shunt capacitance per sector, $C_p$, decreases.

Figure 3:
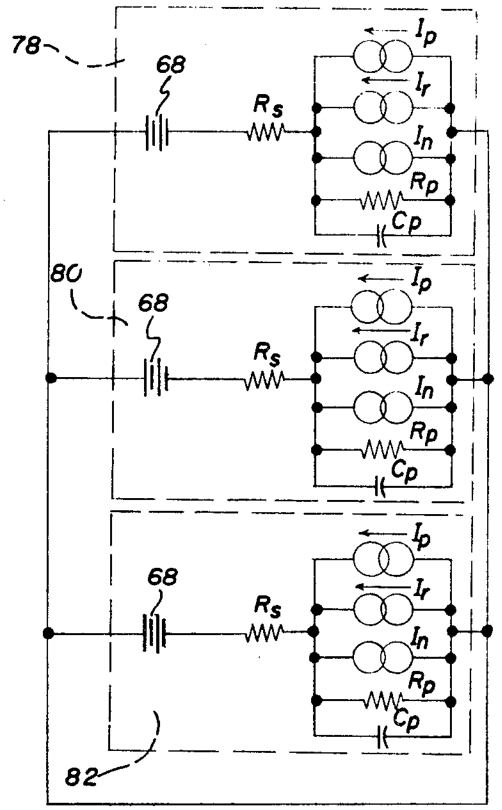
FIG. 3 is a schematic illustration of the equivalent electrical circuit of the PIN photodiode of the present invention.

Referring now to FIG. 3 there is shown a schematic diagram of the equivalent electrical circuit of the PIN photodiodes of the photosensitive semiconductor array 22 biased by the negative bias voltage sources 68. The three photodiodes of the photosensitive semiconductor array 22 are represented by the three parallel circuits 78, 80 and 82 and the circuit parameters noted in FIG. 3 may be defined as follows:

a. $I_p$ is the external current resulting when a single photodiode is illuminated;
b. $I_n$ is the noise current in each photodiode;
c. $I_r$ is the dark current of each photodiode which has a value determined by the construction and dimensions of the particular diode type;
d. $R_p$ is the shunt resistance of each photodiode, usually greater than 10 gigaohms (10,000 megohms);
e. $C_p$ is the shunt capacitance per sector, usually a value from 2–5 picofarads, depending on the diode type and reverse bias voltage;
f. $R_s$ is the series resistance per photodiode and affects high frequency performance; and
g. $F_c$ is the sector cut-off frequency equal to $1/2\ R_sC_p$.

The thickness of the P-type semiconductor region 66 determines the value of the parasitic series resistance $R_s$ in FIG. 3. The thinner the P-type semiconductor region 66, the higher the $R_s$. Since $R_s$ effects high frequency performance there is therefore a design trade-off between quantum efficiency and bandwidth determined primarily by the relationship of the sector cut-off frequency $F_c$ to the series resistance $R_s$ and shunt capacitance $C_p$ as shown in the formula above. Once the design trade-off is settled, the desired thickness of the P-type semiconductor region 66 is then controlled during the diffusion process.

The equivalent circuits, characteristics and structure of each PIN photodiode of the PIN photodiode array 16 set forth above conforms to the description of such PIN photodiodes as disclosed in the aforementioned *Applications Note* 915 — "Threshold Detection of Visible and Infrared Radiation with PIN Photodiodes," published by Hewlett-Packard, Inc.

Figure 4:
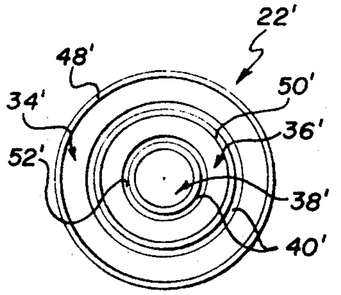
FIGS. 4 and 5 are plan views of further embodiments of the PIN photodiode array of FIG. 1.
Figure 5:
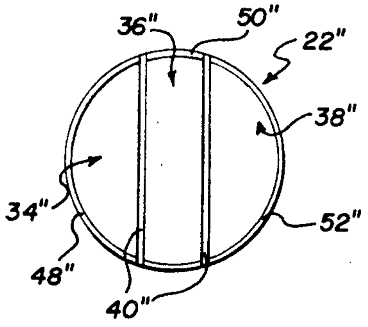

Referring now to FIGS. 4 and 5 there are shown plan views of further photosensitive semiconductor arrays 22' and 22'', respectively. Array 22' consists of annular photoreceptive surfaces 34', 36' and 38' which are electrically isolated from each other by insulating rings 40'. Suitable filters may be provided over the surfaces 34', 36' and 38'.

Array 22'' of FIG. 3 consists of three photoreceptor surfaces 34'', 36'' and 38'' which are electrically isolated from each other by the insulating bars 40''. Again, suitable filters may be provided over the photodiodes.

Because, as stated hereinbefore, the image forming light from any scanned point in the film frame is uniformly mixed in color and is directed upon the entire area of the photosensitive semiconductor arrays 22, 22' and 22'', the photodiodes of each array receiving the light may be altered in shape and in relative area in any desired configuration as shown in FIGS. 1, 4 and 5. Furthermore, the shape and configuration of the depicted arrays and the number of photodiodes in each such array constructed in accordance with the present invention may be altered as desired to suit any particular requirements.

Attendant advantages of the described PIN photodiode arrays include small size, low power supply requirements, and cost, broad spectral response, low noise, ruggedness and stability. Further information concerning the manufacture and operation of PIN photodiodes may be obtained from the aforementioned Hewlett-Packard application note.

Thus, an improved optical-to-electrical signal transducer apparatus has been described. Although a construction of the PIN photodiode arrays have been described, it will be understood that many modifications to the composition and construction may be made within the spirit of the invention. For example, the photodiode array could be constructed of PN or barrier layer photodiodes having at least one common region and a photosensitive junction or junctions between the common region and the separate regions forming the individual diodes of the array, as taught in the description of the preferred embodiment. Furthermore, the arrays may be constructed in the form of phototransistors or other photosensitive semiconductor devices.

The invention has been described in detail with particular reference to the preferred embodiment thereof, but it will be understood that variations and modifications can be effected within the spirit and scope of the invention.

We claim:

1. For use in apparatus including means for forming and projecting a beam of light along an optical axis, a device for producing a plurality of electrical signals representative of colors within such a light beam comprising:

a. a semiconductor element positioned along the axis so that the light beam will impinge thereon, said semiconductor element comprising a first portion formed by a semiconductor material of a first type and having opposed first and second surfaces, a second portion formed by electrical insulating material and having opposed first and second surfaces, said first surface of said insulating material being in contact with said second surface of said semiconductor material of said first type, and a third portion formed by semiconductor material of a second type and having opposed first and second surfaces, said first surface of said semiconductor material of said second type being in contact with said second surface of said insulating material;

b. means extending from said second surface of said semiconductor material of said second type to said first surface of said insulating material for dividing said semiconductor material of said second type and said insulating material into a plurality of corresponding sections such that each of said corresponding sections is electrically isolated from each of said other corresponding sections;

c. electrical means for rendering said semiconductor element responsive to light such that each of said isolated sections produces an electrical output signal having a parameter thereof related to the intensity of light incident on that particular section; and d. means positioned relative to said semiconductor element for restricting the light impinging on each of said sections from the beam to light of a particular color, different for each section, so that a plurality of electrical signals are produced, each of said signals having a parameter related to the amount of a particular color within the light beam.

2. A device as defined in claim 1 wherein said semiconductor material of said second type is permeable to light.

3. A device as defined in claim 2 wherein said light restricting means includes means for dividing the light beam into a plurality of non-overlapping secondary beams of light.

4. A device as defined in claim 3 wherein said light restricting means comprises a plurality of individually distinct color filters arranged in a common plane transverse to the optical axis, said plane being located relative to said semiconductor material of said second type such that each of said color filters is effectively individually superimposed on a corresponding one of said electrically isolated sections.

5. A device as defined in claim 1 wherein said semiconductor material of said first type comprises an N-type semiconductor material and said semiconductor material of said second second type comprises a P-type semiconductor material.

6. For use in apparatus including means for forming and projecting a beam of light along an optical axis, a device for producing a plurality of electrical signals representative of colors within such a light beam comprising:

a. a semiconductor member positioned along the axis so that the light beam will impinge thereon, said semiconductor member defining an array of semiconductor elements for producing such a plurality of electrical signals, said semiconductor member comprising a layer of semiconductor material of a first type having opposed first and second surfaces, a layer of semiconductor material of a second type having opposed first and second surfaces, and a layer of insulating material having opposed first and second surfaces, said layer of insulating material being interposed between said semiconductor material of said first type and said semiconductor material of said second type such that said first surface of said insulating material is in contact with said second surface of said semiconductor material of said first type and said second surface of said insulating material is in contact with said first surface of said semiconductor material of said second type, said semiconductor member further including means for dividing said layer of said semiconductor material of said second type and said layer of said insulating material into a plurality of like portions such that said portions of said semiconductor material of said second type and said insulating material are electrically isolated from the other of said portions wherein each of said electrically isolated portions in cooperation with said semiconductor material of said first type forms a particular one of said semiconductor elements defining said array;

b. electrical means for rendering each of said semiconductor elements responsive to light such that each of said elements produces an electrical output signal having a parameter thereof related to the intensity of light incident on that particular semiconductor element; and c. means positioned relative to said semiconductor member for restricting the light impinging on each of said semiconductor elements from the beam to light of a particular color, different for each element, whereby a plurality of electrical signals are produced, each of said signals having a parameter related to the amount of a particular color within the light beam.

7. A device as defined in claim 6 wherein said light restricting means includes lens means positioned along the optical axis for causing the light beam to diverge and a polychromatic filter spaced relative to said lens means to receive at least a portion of such a beam and to transmit said portion thereof in the form of a plurality of monochromatic beams of light.

* * * * *